(12) United States Patent
Miesak

(10) Patent No.: US 9,014,223 B2
(45) Date of Patent: Apr. 21, 2015

(54) COMPACT HIGH ENERGY MID WAVE OPCPA LASER

(75) Inventor: Edward J. Miesak, Windermere, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/976,652

(22) PCT Filed: Dec. 28, 2011

(86) PCT No.: PCT/US2011/067563
§ 371 (c)(1),
(2), (4) Date: Jun. 27, 2013

(87) PCT Pub. No.: WO2012/092359
PCT Pub. Date: Jul. 5, 2012

(65) Prior Publication Data
US 2013/0279529 A1    Oct. 24, 2013

Related U.S. Application Data

(63) Continuation-in-part of application No. 12/846,606, filed on Jul. 29, 2010.

(60) Provisional application No. 61/428,362, filed on Dec. 30, 2010.

(51) Int. Cl.
*H01S 3/10* (2006.01)
*H01S 3/00* (2006.01)

(52) U.S. Cl.
CPC .................. *H01S 3/10* (2013.01); *H01S 3/0057* (2013.01)

(58) Field of Classification Search
CPC ......... H01S 3/00; H01S 3/005; H01S 3/0057; H01S 3/02; H01S 3/06704; H01S 3/08009; H01S 3/09; H01S 3/10007; H01S 3/10023

USPC ................................................ 372/25, 30, 69
See application file for complete search history.

(56) References Cited

U.S. PATENT DOCUMENTS

| | | |
|---|---|---|
| 6,198,568 B1 | 3/2001 | Galvanauskas et al. |
| 7,054,065 B2 | 5/2006 | Wolfe et al. |
| 7,257,302 B2 | 8/2007 | Fermann et al. |
| 7,359,420 B2 | 4/2008 | Shchegrov et al. |
| 7,424,185 B2 | 9/2008 | Glebov et al. |
| 7,444,049 B1 | 10/2008 | Kim et al. |
| 2003/0112494 A1 | 6/2003 | Barty et al. |

(Continued)

FOREIGN PATENT DOCUMENTS

CN    101473251 A    7/2009

OTHER PUBLICATIONS

Non-final Office Action for U.S. Appl. No. 12/846,606 mailed Apr. 4, 2012, 23 pages.
Final Office Action for U.S. Appl. No. 12/846,606 mailed Aug. 28, 2012, 26 pages.
International Preliminary Report on Patentability for PCT/US2011/067563 mailed Jul. 11, 2013, 9 pages.

(Continued)

*Primary Examiner* — Dung Nguyen
(74) *Attorney, Agent, or Firm* — Withrow & Terranova, PLLC

(57) ABSTRACT

Systems and methods of optical parametric chirped pulse amplification for laser pulses are provided. Techniques and components include replacing pulse stretcher and/or pulse compressors with chirped volume Bragg gratings (CVBGs) to reduce size, weight, cost, and environmental sensitivity of the laser system.

13 Claims, 4 Drawing Sheets

(56) References Cited

U.S. PATENT DOCUMENTS

| | | | |
|---|---|---|---|
| 2007/0237191 A1* | 10/2007 | Kafka et al. | 372/20 |
| 2008/0159346 A1 | 7/2008 | Brennan et al. | |
| 2009/0251769 A1 | 10/2009 | Kong et al. | |
| 2010/0309545 A1 | 12/2010 | Zaouter et al. | |

OTHER PUBLICATIONS

International Search Report for PCT/US2011/067563, mailed Aug. 31, 2012.

First Office Action for Chinese Patent Application No. 201180068572.8, issued Dec. 23, 2014, 26 pages.

* cited by examiner

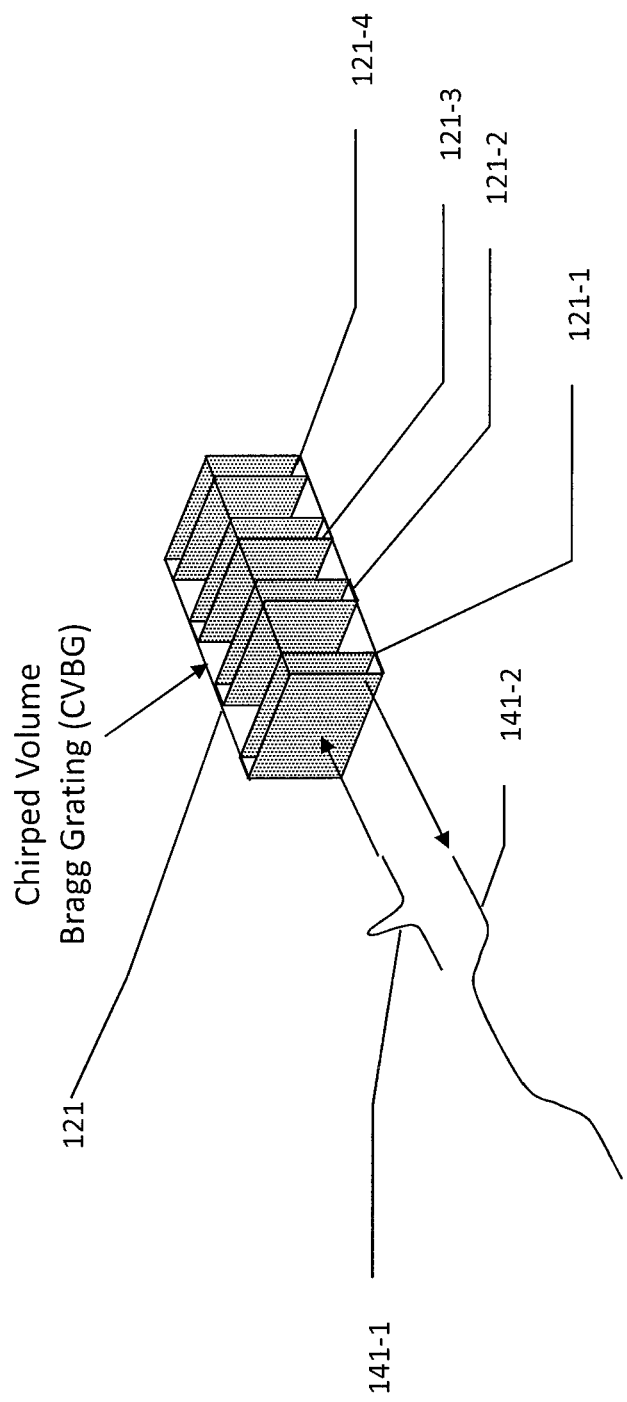

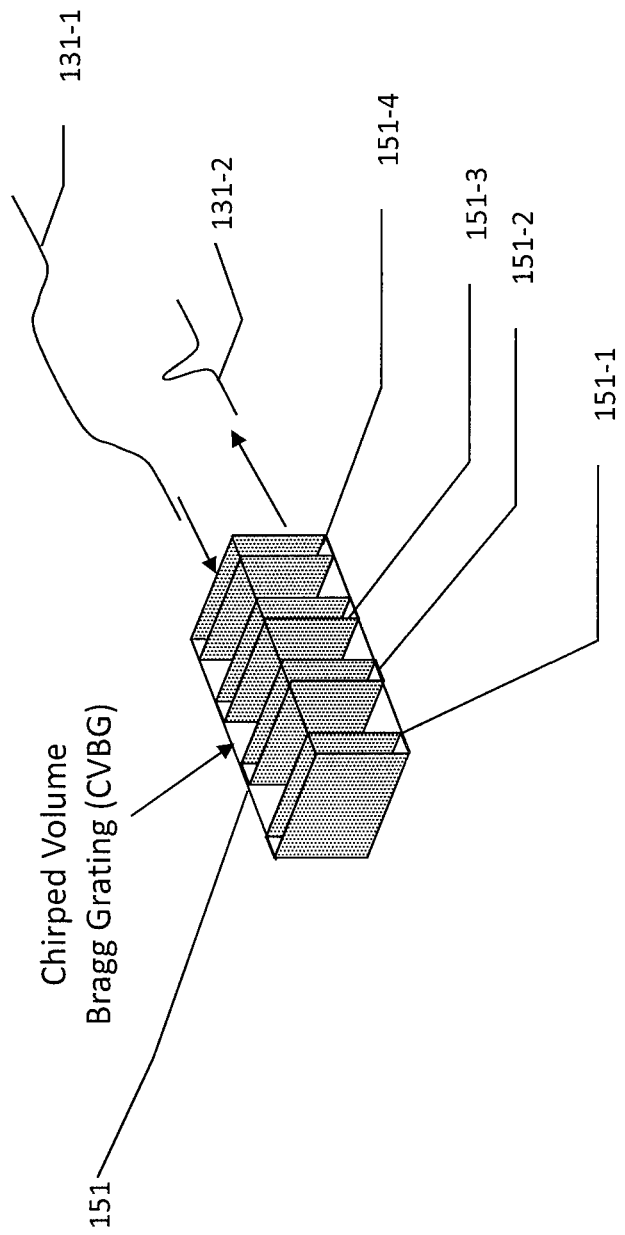

US 9,014,223 B2

COMPACT HIGH ENERGY MID WAVE OPCPA LASER

PRIORITY

This application is a 35 U.S.C. 371 national phase filing of International Application No. PCT/US2011/067563, filed on Dec. 28, 2011, which claims priority under 35 U.S.C. §119(e) from U.S. Provisional Application No. 61/428,362 filed on Dec. 30, 2010, and is further a continuation-in-part of U.S. patent application Ser. No. 12/846,606 filed with the United States Patent and Trademark Office on Jul. 29, 2010, the disclosures of which are hereby incorporated herein by reference in their entireties.

FIELD OF USE

The present document pertains to a vibration-tolerant, high energy source of laser pulses that is compact in size, has a reduced number of components, and can be moved/transported without risk of damage or mis-alignment. It is rugged enough that it can be reliably used on moving platforms.

BACKGROUND

Chirped pulse amplification is a technique for making energetic femtosecond laser pulses. In this technique, the peak power is reduced by stretching the pulse, then the pulse is amplified, and finally the original pulse width is restored through compression. Stretching/compression ratios may be as high as 5000, stretching a 50 femtosecond pulse to more than 2 nanoseconds for amplification. One difficulty in chirped pulse amplification techniques is the size of pulse stretchers and compressors.

Ultrashort Pulse Lasers (USPL), which can generate picosecond and femto-second laser pulses, require pulse stretchers and compressors. The stretchers and compressors currently known in the art are difficult to build and even more difficult to align. They are very sensitive to vibrations and minute perturbations. Also, they are generally custom-built and there are no suitable commercial off-the-shelf (COTS) alternatives.

Amplification for short pulse lasers operating in the near and mid wave infra-red (i.e. lasers with wavelengths of approximately 1 to 8 microns) is typically accomplished using difference frequency generation in an Optical Parametric Amplifier (OPA). This causes the OPA to generate an output pulse and an idler pulse according to the Manley-Rowe equation, which states that the inverse of the pump laser wavelength used to pump the OPA is equal to the sum of the inverses of the signal and idler output pulse wavelengths ($1/\lambda_{pump} = 1/\lambda_{signal} 1/\lambda_{idler}$).

Recompressing the output pulse has been done in the past but with large and complex pulse stretchers and compressors. Typical pulse stretchers and compressors are large and have many sensitive components. A typical pulse stretcher volume is related to the amount of stretch. A small one could occupy approximately 5 ft$^3$. The alignment tolerances in a typical pulse stretcher are very small, similar to interferometer tolerances. The critical lengths are generally in sub millimeters. This combination of large overall size and very tight alignment and critical length tolerances prevent a laser including such a typical pulse stretcher from tolerating vibrations, contamination, and temperature excursions. This type of laser (Chirped Pulse amplification or CPA) is has little to no chance of being mounted to a moving vehicle.

Typical pulse compressors share these size and alignment tolerance limitations of typical pulse stretchers. In typical high-power (joule per pulse) chirped-pulse amplification (CPA) laser systems, stretcher and compressor components typically take up a large portion of the system size. A CPA laser equipped with a typical pulse stretcher and a typical pulse compressor may have a total volume in excess of fifteen cubic feet, with the bulk of that occupied by the pulse stretcher and compressor. CPA systems having more than one stretcher or compressor may be even larger. Furthermore, because of the above-noted sub-millimeter alignment tolerances, such CPA systems are difficult to properly align and do not remain aligned outside of lab environments, making them unsuitable for practical applications and effectively unusable in any sort of field or mobile setting.

SUMMARY

Some variations of the techniques and systems discussed herein may pertain to an optical parametric chirped pulse amplification (OPCPA) laser system, the system comprising: a seed laser; a pump laser; an amplifier having an input side and an output side, where the seed laser and the pump laser are disposed on the input side of the amplifier; a chirped volume Bragg grating (CVBG) pulse stretcher disposed between the seed laser and the input side the amplifier; and a grating compressor disposed on the output side of the amplifier.

In some variations, the seed laser has a wavelength of less than 2.9 μm. In further variations, the pulse stretcher is 4×4×25 mm. Yet further variations may include a ruggedized enclosure that protects system components from damage, mis-alignment, and/or malfunction due to environmental factors. In further variations still, the grating compressor is also a CVBG.

In some variations, the amplifier includes an optical parametric amplifier (OPA). In further variations, the amplifier is configured to generate a signal output pulse and an idler output pulse. In yet further variations, the system may include an idler extraction module disposed on the output side of the amplifier between the amplifier and the grating compressor; and an idler grating compressor disposed on the output side of the amplifier such that it receives an idler pulse extracted by the idler extraction module. In further variations still the idler grating compressor is also a CVBG.

In some variations, the CVBG grating compressor has the same chirp as the CVBG pulse stretcher. In further variations, the CVBG idler grating compressor has the same chirp and same sign as the CVBG pulse stretcher. In further variations still, the amplifier includes an OPA chain providing approximately two billion times amplification Additional variations of techniques and systems discussed herein may pertain to a method of generating a high-energy laser pulse in an optical parametric chirped pulse amplification (OPCPA) laser system, the method comprising: providing a seed laser signal from a seed laser source; providing a chirped volume Bragg grating (CVBG) pulse stretcher; stretching the provided seed laser signal with the CVBG pulse stretcher; amplifying the stretched laser signal with an amplifier, where said amplifying includes pumping the amplifier with a pump laser source; and compressing the amplified laser signal into an output pulse with a grating compressor.

In some method variations, amplifying includes performing optical parametric amplification (OPA). In further method variations, amplifying includes generating an idler pulse and the method further comprises: extracting the generated idler pulse from an output side of the amplifier; and compressing the extracted idler pulse into an output pulse with an idler grating compressor.

In some method variations, compressing the amplified laser signal includes: providing a CVBG pulse compressor as the grating compressor; and compressing the amplified laser signal with the CVBG pulse compressor; where the CVBG pulse compressor has the same chirp as the CVBG pulse stretcher. In further method variations, performing OPA includes providing an OPA chain that provides approximately 2 billion times amplification.

Yet further variations of techniques and systems discussed herein may pertain to an optical parametric chirped pulse amplification (OPCPA) laser system, the system comprising: a mid-wave, infra-red seed laser; a pump laser; an optical parametric amplifier (OPA) having an input side and an output side, where the seed laser and the pump laser are disposed on the input side of the OPA; a chirped volume Bragg grating (CVBG) pulse stretcher disposed between the seed laser and the input side the OPA; a signal grating compressor disposed on the output side of the OPA; an idler grating compressor disposed on the output side of the OPA; an idler extract module disposed between the output side of the OPA and the idler grating compressor; and a ruggedized enclosure that protects system components from damage, mis-alignment, and/or malfunction due to environmental factors.

In some such variations, the idler grating compressor and signal grating compressor are both CVBGs having the same chirp as the pulse stretcher. In further variations, the OPA includes an OPA chain providing approximately two billion times amplification and where the system is configured to generate an output pulse having an energy of up to 5 Joules. In yet further variations, the enclosure has a total volume of less than four cubic feet.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein

FIG. 2a shows an embodiment of a CVBG pulse stretcher according to the present invention;

FIG. 2b shows an embodiment of a CVBG pulse compressor according to the present inventions.

The drawings will be described in detail in the course of the detailed description of the invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

One variation of a laser system discussed herein replaces a large, complex and fragile pulse stretcher with a small Chirped Volume Bragg Grating (CVBG). Embodiments of laser systems discussed herein use standard lasers as the seed and pump. One variation of an embodiment discussed herein extracts a by-product of the amplification process, the idler, and uses the extracted idler as the output. In some variations, the idler may re-compressed in a standard grating pair compressor. A CVBG may be configured with a a well-matched second order dispersion to a grating compressor. In other variations, the idler may be re-compressed using another CVBG.

Figure 1:
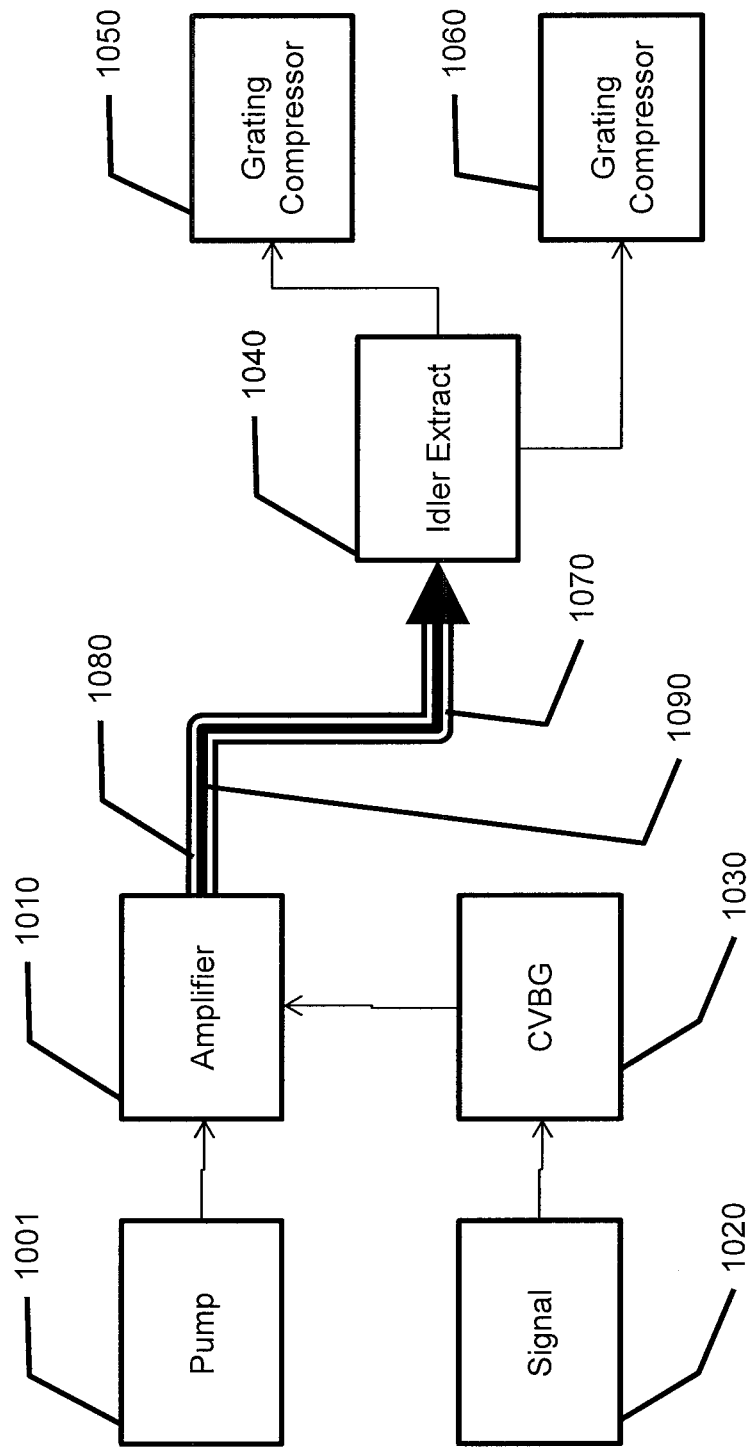
FIG. 1 shows an embodiment of a system architecture according to the present invention.
Figure 3:
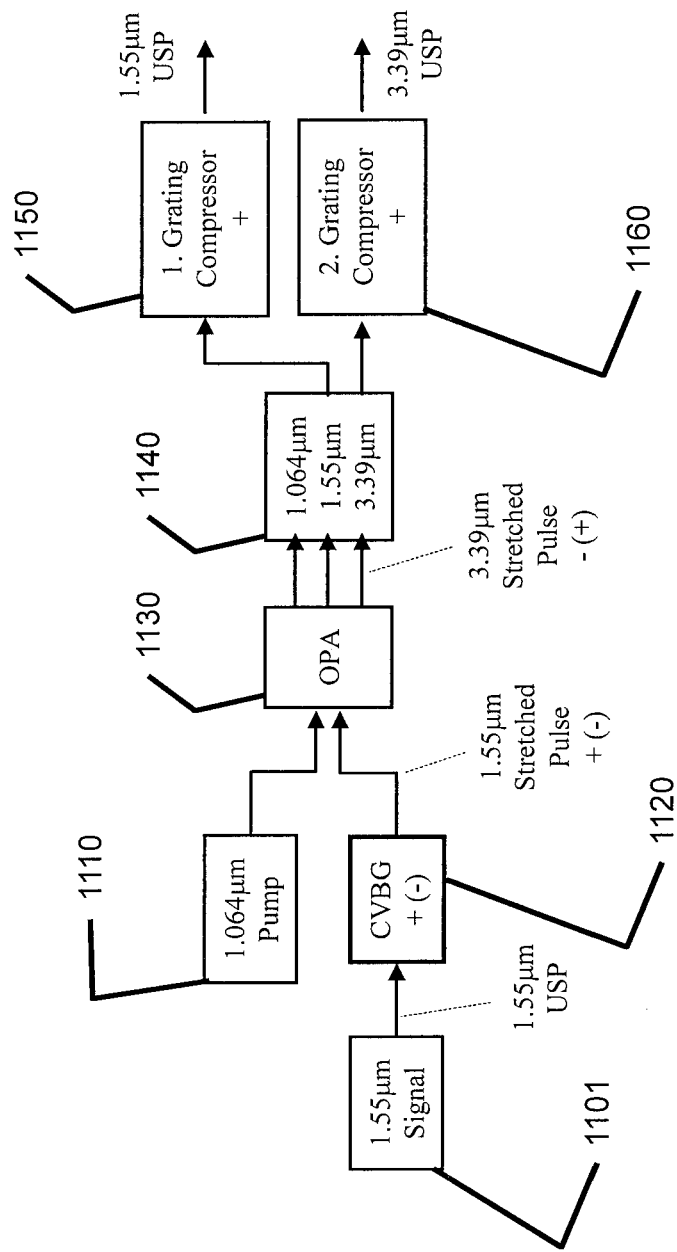
FIG. 3 shows an alternative embodiment of a system architecture according to the present invention.

One embodiment of a laser system according to the teachings of the present invention is depicted in FIG. 1. As shown in the figure, a seed laser 1020 generates an ultra-short pulse (USP). This USP is then passed through a CVBG 1030 to stretch the signal before it is amplified in an amplifier 1010. In some variations, the amplifier 1010 may be an OPA. In other variations, the amplifier 1010 may be an amplification chain that includes multiple amplifiers, some of all of which may be OPAs. In yet other variations, the amplifier 1010 may include one or more multiple-pass OPAs.

In variations where the seed laser generates 1020 a USP, the USP is preferably stretched because it is difficult to amplify USPs. If amplified in an un-stretched state, the intensity of a USP may very quickly exceed the tolerances or capabilities of the laser system. In some cases, undesirable non-linear effects begin to appear, which make it difficult to further amplify or control the pulse. Such undesirable effects may include, but are not limited to, non-linear phase, gain saturation, gain dispersion, distortion of temporal and spectral pulse shape, self-focusing, and amplified spontaneous emission.

Stretching a USP by one or more orders of magnitude (such as, for instance 100×, which would go from 100 fsec to 10 psec) lowers the intensity by a comparable amount (100× for a 100× stretch) and allows the energy of the stretched pulse to be increased by up to 100× (or more, in some cases) before hitting the same intensity limit and associated non-linear effects and related difficulties.

In some variations, the amplifier 1010 may be fed by a pump laser 1001 that is selected based on amplifier type and desired amplification level. In some variations, the inverse of the pump wavelength is equal to the sum of the inverse of the signal wavelength and the inverse of an idler wavelength. Therefore, in some cases, the pump wavelength may be selected or configured depending on a desired or expected idler signal. In some variations involving multiple amplifiers, one or more amplifiers may have their own pump lasers. In other variations, a common pump laser may be used to pump multiple amplifiers.

The amplifier 1010 or amplification chain is preferably configured to generate three outputs: a signal output 1090, a pump output 1080, and an idler output 1070, which is a by-product of the amplification process. The idler is a by-product of signal amplification as a result of energy conservation. The three wavelength relationship is based on the Manley-Rowe equation, which states that the inverse of the pump laser wavelength used to pump an amplifier 1010 is equal to the sum of the inverses of the signal and idler output pulse wavelengths ($1/\lambda_{pump} = 1/\lambda_{signal} + 1/\lambda_{idler}$). In variations where a particular idler output 1070 is desired, the amplifier 1010 or amplification chain may include at least one OPA and the wavelengths of the seed laser 1020 and pump laser 1001 for the OPA may be selected based on the Manley-Rowe equation with a particular idler wavelength or wavelength range in mind.

In many applications, broad spectrum signal amplification is the only concern. In such cases the idler is ignored, discarded or suppressed once it leaves the mixing crystal.

Whereas in most cases the idler signal is suppressed, ignored, or discarded, the system depicted in FIG. 1a passes the outputs of the amplifier 1010 through an idler extraction portion 1040 that suppresses the pump output 1080, leaving the idler 1070 and signal 1090 outputs. In some variations, the idler extraction portion 1040 may include a mirror that reflects only the idler or a reflector combined with a filter that passes only the idler. The idler 1070 and signal 1090 pulses are then each sent to grating compressors 1050 1060 to produce ultra-short pulse outputs.

Uses for such amplified ultra-short pulses are often defined by the wavelength. Producing two output wavelengths allows for a more versatile system. Other variations of such a laser system as depicted in FIG. 1 may use only the idler output 1070 and suppress, discard, or ignore both the signal 1090 and pump 1080 outputs. In such variations, a single grating compressor 1060 or compression operation may be required.

In some variations, the grating compressor for the signal 1050 has the same chirp as the CVBG stretcher 1030 but opposite in sign. In some variations, a CVBG could be used as a stretcher 1030 and a compressor 1050 for the signal wavelength. In such variations, a CVBG of the same type used for the pulse stretcher 1030 may be used for pulse compression 1050. In some variations, signal wavelengths of less than about 2.9 μm may be stretched and compressed this way. In further variations, the grating compressor for the idler 1060 may have the same chirp as the stretcher 1030 and even the same sign. Also, depending on the wavelengths in question, a CVBG may be used as a compressor 1060 for the idler. Certain wavelengths, however, may be unsuitable for compression with a CVBG. This may be a factor related to the materials used to make a CVBG and their transmission capabilities and limitations.

In some variations, a seed laser 1020 may be a COTS near infra-red (NIR) laser, the pulse stretcher 1030 may be a COTS CVBG. The seed output may be amplified in an optical parametric amplifier (OPA) 1010, creating a mid-wave idler 1070 having a wavelength of between 3 and 5 microns. The mid-wave idler 1070 may then be extracted from the amplifier output with a mirror that reflects only the idler 1040 and compressed using the grating compressor 1060.

In some variations, instead of being separated or discarded, the pump 1080 signal may be extracted or combined with one or both of the seed 1090 and idler 1070 pulses. In some variations, amplifiers 1010 or amplification chains including single-pass or multi-pass OPAs, or multiple OPAs may be used. In other variations, different amplifier types may be employed. Preferably, the amplifier or set of amplifiers used will generate an idler. In some variations, a system of the type discussed above may be placed in a portable or vehicle-mounted enclosure that is sealed against dust, moisture, and other environmental contaminants. Such an enclosure may include shock-absorbing components or assemblies to keep telescopes, mirrors, and other components properly aligned.

In some variations, an entire system may be contained within an enclosure that protects against contamination and/or provides a light-proof environment. In some variations, the components within the enclosure may be further encased in foam or molded materials such that only the beam-paths between components are open space within the enclosure. In other variations, an enclosure might include gyroscopic elements that preserve the alignment of individual system components regardless of orientation or dislocation of the assembly.

The solution proposed in this disclosure eliminates the pulse stretcher with a CVBG, which is a single optical component that is very tolerant of slight mis-alignments and which, by virtue of being a single component, is not subject to type of internal perturbation or alignment problems of a typical pulse stretcher. This makes the laser system more tolerant to external conditions of the type that exist on moving platforms. It also makes the system smaller. A typical pulse stretcher volume is related to the amount of stretch. A small one could occupy 3-5 ft$^3$. The alignment tolerances in a typical pulse stretcher are very small, similar to interferometer tolerances. The critical lengths are generally in sub millimeters.

By contrast, a CVBG may itself be measured in millimeters. In some variations, a 4 mm×4 mm×25 mm CVBG can be used to stretch a pulse from about 100 fsec to about 150 psec. A comparable typical pulse stretcher would be about 4-5 ft$^3$. An embodiment of a CVBG pulse stretcher is shown in FIG. 2a.

As can be seen from the figure, a CVBG 121 may be a block or other solid object made of range of materials, including photo-thermal refractive glasses, plastics or polymers with appropriate thermal properties. In the example shown, the CVBG 121 has four gratings 121-1, 121-2, 121-3, 121-4 each having the same bandwidth. Variations of a CVBG 121 may have as many gratings as cost, space, and power requirements may permit. Using the CVBG as a stretcher, a narrow pulse 141-1 is transmitted into a face of the CVBG and individual gratings return a portion of the input pulse such that the overall output is a longer, multi-spectral pulse 141-2 made up of the returned pulse portions. In one example of a CVBG stretcher, a CVBG having N gratings each with a reflection band of approximately 1 nanometer will stretch an input pulse having a bandwidth of N to N*100 picoseconds.

FIG. 2b shows an embodiment of a CVBG used as a compressor, a long, multi-spectral pulse 131-1 is input into an opposite face of the CVBG 151 and individual gratings 151-4, 151-3, 151-2, 151-1 return portions of the input pulse such that all the portions exit the CVBG 151 at the same time to produce a shorter, higher-power pulse 131-2.

In some variations of laser systems as discussed herein, the pulse strecher 1030 or the grating compressor(s) 1060 1050 may be a multi-plate volume bragg gratings (VBGs) of the type disclosed in U.S. patent application Ser. No. 12/846,606 filed with the United States Patent and Trademark Office on Jul. 29, 2010, the entire contents of which are hereby incorporated by reference. In further variations, a CVBG may be used as both a pulse stretcher 1030 and grating compressor 1060 1050 depending on which face of the CVBG is used as the input face. In some variations, a laser system as described herein may be equipped with a single CVBG that receives input pulses to be stretched at one input face and receives output pulses to be compressed at the opposite input face.

The arrangement depicted in FIG. 1a pairs a CVBG pulse stretcher with a grating pair compressor making it possible to reach high output intensities. Replacing both the stretcher and compressor with CVBG technology will make a CPA laser able to be truly rugged and tolerant to environmental conditions because typical pulse stretchers and compressors are very sensitive to environmental effects, large, and expensive. Removing them removes their problems from the system, reducing the overall number of components and attendant points of failure.

An alternate embodiment of a CVBG-based pulse stretching and compression ultra-short laser pulse system is depicted in FIG. 1b. In the embodiment shown, a 1.55 micron signal laser 1101 generates a 1.55 micron ultra-short pulse that is fed into a 4×4×25 mm CVBG 1120 to stretch the pulse. The stretched pulse is then fed to an optical parametric amplifier (OPA) 1130 which is pumped by a 1.064 micron pump 1110. Because the inverse of pump wavelength in an OPA is equal to the sum of the inverses of the signal and idler wavelengths, the OPA produces, in addition to an amplified 1.55 micron pump signal, a 3.39 micron stretched idler pulse, which is a mid-wave infra-red pulse. The pump, signal, and idler are fed into a filter 1140 that removes the pump signal, leaving only the amplified signal and idler pulses. Each of those is then passed to a grating compressor 1150 1160. The grating compressors are also CVBG devices, further reducing the complexity of the laser system. The grating compressors compress the 1.55 micron signal and 3.39 micron idler pulses back into ultra-short pulses. Each compressed pulse now has a higher power by virtue of having been amplified while stretched. In some variations, seed laser having a pulse energy of 5 nJ and an OPA chain providing approximately two billion times amplification may, because of the CVBG pulse stretching and compression before and after amplification, generate an output pulse having an energy of up to 5 J. Variations of CVBGs and/or pulse compressors having large apertures may allow for even higher levels of amplification.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A chirped pulse amplification (CPA) laser system, the system comprising:
   a seed laser;
   a pump laser;
   an amplifier having an input side and an output side, where the seed laser and the pump laser are disposed on the input side of the amplifier, the amplifier being configured to generate a signal output pulse and an idler output pulse;
   a chirped volume Bragg grating (CVBG) pulse stretcher disposed between the seed laser and the input side of the amplifier;
   a grating compressor disposed on the output side of the amplifier;
   an idler extraction module disposed on the output side of the amplifier between the amplifier and the grating compressor; and
   an idler grating compressor disposed on the output side of the amplifier such that the idler grating compressor receives an idler pulse extracted by the idler extraction module.

2. The CPA laser system of claim 1, where the seed laser is a near-infrared laser having a wavelength of less than 2.9 μm.

3. The CPA laser system of claim 1, the system further comprising a ruggedized enclosure that protects system components from damage, mis-alignment, and/or malfunction due to environmental factors.

4. The CPA laser system of claim 1, where the grating compressor is also a CVBG.

5. The CPA laser system of claim 1, where the amplifier includes an optical parametric amplifier (OPA).

6. The CPA laser system of claim 1, where the idler grating compressor is also a CVBG.

7. The CPA laser system of claim 6, where the CVBG idler grating compressor has the same chirp and same sign as the CVBG pulse stretcher.

8. The CPA laser system of claim 1, where the amplifier includes an OPA chain providing approximately two billion times amplification.

9. An optical parametric chirped pulse amplification (OPCPA) laser system, the system comprising:
   a mid-wave, infra-red seed laser;
   a pump laser; an optical parametric amplifier (OPA) having an input side and an output side, where the seed laser and the pump laser are disposed on the input side of the OPA;
   a chirped volume Bragg grating (CVBG) pulse stretcher disposed between the seed laser and the input side the OPA;
   a signal grating compressor disposed on the output side of the OPA;
   an idler grating compressor disposed on the output side of the OPA;
   an idler extract module disposed between the output side of the OPA and the idler grating compressor; and
   a ruggedized enclosure that protects system components from damage, mis-alignment, and/or malfunction due to environmental factors.

10. The OPCPA laser system of claim 9, where the idler grating compressor and signal grating compressor are both CVBGs having the same chirp as the pulse stretcher.

11. The OPCPA laser system of claim 9, where the OPA includes an OPA chain providing approximately two billion times amplification and where the system is configured to generate an output pulse having an energy of up to 5 Joules.

12. The OPCPA laser system of claim 9, where the enclosure has a total volume of less than four cubic feet.

13. The CPA laser system of claim 4, where the CVBG grating compressor has the same chirp as the CVBG pulse stretcher.

* * * * *